United States Patent
Patil et al.

(10) Patent No.: US 6,977,277 B2
(45) Date of Patent: *Dec. 20, 2005

(54) POLYVINYL CHLORIDE RESINS

(75) Inventors: Abhimanyu O. Patil, Westfield, NJ (US); Donald N. Schulz, Annandale, NJ (US); Manika Varma-Nair, Warren, NJ (US); David J. Lohse, Bridgewater, NJ (US); Christine A. Costello, Easton, PA (US); Richard H. Schlosberg, Bridgewater, NJ (US); Michael G. Matturro, Lambertville, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 83 days.

This patent is subject to a terminal disclaimer.

(21) Appl. No.: 10/420,420

(22) Filed: Apr. 22, 2003

(65) Prior Publication Data

US 2003/0181593 A1 Sep. 25, 2003

Related U.S. Application Data

(63) Continuation-in-part of application No. 09/882,414, filed on Jun. 15, 2001, now abandoned, which is a continuation-in-part of application No. 09/618,186, filed on Jul. 18, 2000, now abandoned.

(51) Int. Cl.$^7$ ............................ C08L 27/06; C08F 67/02
(52) U.S. Cl. ........................ 524/296; 524/287; 524/297; 524/298; 524/314; 524/357; 524/425; 524/445; 525/185; 525/190
(58) Field of Search ................................ 525/185, 190; 524/287, 296, 297, 298, 314, 357, 425, 445

(56) References Cited

U.S. PATENT DOCUMENTS

| | | | |
|---|---|---|---|
| 3,780,140 A | | 12/1973 | Hammer |
| 6,156,872 A | * | 12/2000 | Patil et al. ................ 528/392 |
| 6,262,225 B1 | * | 7/2001 | Patil et al. ................ 528/392 |
| 6,750,278 B2 | * | 6/2004 | Patil et al. ................ 524/296 |
| 2002/0042475 A1 | * | 4/2002 | Patil et al. ................ 525/185 |

FOREIGN PATENT DOCUMENTS

| | | | |
|---|---|---|---|
| CA | 2099104 | * | 12/1993 |
| WO | WO 90/13600 | | 11/1990 |
| WO | WO 92/07029 | | 4/1992 |
| WO | WO-00/43437 | * | 7/2000 |
| WO | WO-02/06395 | * | 1/2002 |

OTHER PUBLICATIONS

Database WPI, Section Ch, Week 199210, Derwent Publications Ltd, London, GB/Class A24, AN 1992–07264, XP00220064 & JP 04 023854A (Mitsui Dupont Poly), Jan. 28, 1992 abstract.

* cited by examiner

Primary Examiner—David J. Buttner

(57) ABSTRACT

The invention is directed towards a PVC resin composition comprising polyvinyl chloride and a liquid plasticizer selected from the group consisting of: (i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear olefin-CO—X terpolymer. A method of preparing the resins is also described.

25 Claims, No Drawings

POLYVINYL CHLORIDE RESINS

This application is a Continuation-in-Part of U.S. Ser. No. 9/882,414 filed on Jun. 15, 2001, now abandoned, which is a Continuation-in-Part of U.S. Ser. No. 09/618,186 filed on Jul. 18, 2000, now abandoned.

FIELD OF THE INVENTION

The invention is directed towards novel carbon monoxide containing compositions effective as plasticizers for polyvinyl chloride resins.

BACKGROUND

Polyvinyl chloride (PVC) is a versatile polymer which is used in many applications such as water piping, floor tile, exterior vinyl siding, electrical wire insulation, shower curtains and synthetic leather. Plasticizers are added to PVC to improve flow, and therefore processability, as well as to reduce the brittleness of the product. A plasticizer is a material incorporated in a plastic to increase its workability and its flexibility or distensibility (i.e., elongation). This is achieved by lowering the glass transition temperature ("$T_g$"), thereby producing a change in properties from those of a hard, brittle, glasslike solid to those of a soft, flexible, tough material. The vast majority of plasticizers used today are monomeric ester-types. Phthalates such as diisononyl phthalate, diisodecyl phthalate and di(2-ethylhexyl) phthalate (dioctyl phthalate, DOP) are well known and commonly used plasticizers. Further, plasticizers are usually added to PVC on hot rolls or in a hot mixer such as a Banbury. The plasticizer content varies widely depending on the end use of the material; however, typically plasticizer content will be approximately 5 to approximately 50% by weight.

When evaluating which plasticizers should be used for a particular application, the permanence of the plasticizer, in addition to miscibility with the PVC, is crucial. Permanence refers to the stability of plasticizer within the blend. More specifically, plasticizers, especially those with low molecular weights, tend to be migratory in that they tend to move to the surface of the blend where they subsequently evaporate and/or may be removed by soapy water, solvents, oils, etc. These problems are minimized by using high molecular weight polymers. Unfortunately, very high molecular weight polymers may present processing and compatibility problems, cause poor low temperature flexibility, and become costly.

Copolymers of ethylene, carbon monoxide and a termonomer(s), such as vinyl acetate, have been used as plasticizers in blends with PVC to produce flexible films, as well as, rigid and semi-rigid materials. These plasticizers are compatible with PVC, lower the $T_g$ and possess adequate permanence. However, while these plasticizers have proved to be effective, they are prepared using pure feeds of the individual monomers which can be costly. Hence, there is still a need to investigate other PVC plasticizers which are compatible with PVC and sufficiently lower the PVC resin's $T_g$. Additionally, less expensive avenues to produce known plasticizers should also be pursued.

SUMMARY OF INVENTION

The instant invention provides novel polyvinyl chloride compositions having liquid CO-containing polymers which act as plasticizers. Depending on the particular plasticizer(s) used and the type of PVC, percentage mix, etc., advantages of the instant invention include: lower plasticizer volatility and accompanying lower migration; lower cost than conventional monomeric plasticizers; improved processability and compatibility; and effective lowering of the PVC resin glass transition temperature ("$T_g$").

In one embodiment, the invention is a PVC resin composition comprising polyvinyl chloride and a liquid plasticizer wherein said liquid plasticizer is selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear olefin-CO—X terpolymer and mixtures thereof, wherein X is selected from the group consisting of free radically polymerizable vinyl monomers and mixtures thereof, wherein the liquid plasticizer has a number average molecular weight ($M_n$) of from about 200 to about 2,000 and has about 65.5 or more branches per 1,000 carbon atoms, and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

The composition may further comprise a compound selected from the group consisting of dialkyl phthalate, dialkyl isophthalate, dialkyl terephthalate, trialkyl trimellitate, tetraalkyl pyromellitate, monoalkhyl benzoate, dialkyl azelate, dialkyl sebacate, dialkyl adipate, and mixtures thereof. Such compounds are commonly referred to as co-plasticizers. The composition may also further comprising a stabilizer or filler selected from the group consisting of calcium, barium, cadmium, zinc, lead, calcium carbonate, clay, and mixtures thereof.

In another embodiment, the invention is a product prepared from the PVC resin as described above wherein said product is selected from the group consisting of a film, a sheet, an extruded item, a molded item a cast item and mixtures thereof.

In yet another embodiment, the invention is a method for preparing a PVC resin comprising blending polyvinyl chloride with a liquid plasticizer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear olefin-CO—X terpolymer and mixtures thereof, wherein X is selected from the group consisting of free radically polymerizable vinyl monomers and mixtures thereof, wherein the liquid plasticizer has a number average molecular weight ($m_n$) of from about 200 to about 2,000 and has about 65.5 or more branches per 1,000 carbon atoms, and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95 mole % and wherein said olefins in said first feed comprising olefins are selected from the group consisting of linear and branched $C_2$ to $C_{30}$ olefins, diolefins and mixtures thereof.

This method may further comprise the step of blending a compound selected from the group consisting of dialkyl phthalate, dialkyl isophthalate, dialkyl terephthalate, trialkyl trimellitate, tetraalkyl pyromellitate, monoalkyl benzoate, dialkyl azelate, dialkyl sebacate, dialkyl adipate, and mixtures thereof.

These and other features, aspects and advantages of the present invention will become better understood with regard to the following description and appended claims.

DESCRIPTION

The instant invention relates to novel PVC/liquid plasticizer blends and the method of producing such blends based on carbon monoxide ("CO") containing plasticizers. As used herein, a non-pure feedstream is a feedstream comprising a first feed comprising olefins and a second feed comprising carbon monoxide where the amount of olefins and carbon monoxide combined is less than or equal to 95 mole %. The non-pure feed can be either a combination of the first and second feed or a co-feed of the first and second feed.

Hence, for the non-pure feeds, it is possible for either of the first olefinic feed or the second CO feed to be a pure feed so long as once the feeds are combined, the amount of olefin in combination with CO is less than or equal to 95 mole %. Additionally, when the feed comprising CO contains $\geqq 90$ mole % CO, the remaining 90% of the feed will preferably comprise at least 90 mole % hydrogen. It is also, therefore, possible for each of the first olefinic feed and second CO feed to contain other components. For example, while the first olefinic feed may be a pure feed of vinyl monomers, including olefins, the CO feed may comprise synthesis gas ("syngas") or multi-component synthesis gas ("MCS"). Alternatively, for example, the CO may originate from MCS feeds which contain at least one olefin, carbon monoxide, hydrogen, carbon dioxide, methane and optionally acetylene or paraffins. Typically the first feed comprising olefins will contain $C_3$ to $C_6$ olefins or dienes. If the CO feedstream is not pure and contains components other than CO, it will typically contain up to 90-mole % CO, preferably up to 95-mole % CO These CO-containing polymers are low molecular weight ("MW") copolymers. Low MW means less than 50,000, preferably less than 30,000 and most preferably between about 200 to 2,000. It should be appreciated by those skilled in the art that use of the general term "copolymers" includes terpolymers and other polymers having various combinations of different monomer units. It should also be appreciated that the term "polyvinyl chloride" or "PVC" means homopolymers of vinyl chloride, as well as, copolymers thereof containing up to about 20% of other monomers including, but not limited to, vinyl acetate, propylene, ethylene, butyl vinyl ether, diethyl maleate, dimethyl fumarate, etc. CO feeds utilizable herein are described in U.S. Pat. No. 6,049,011 to Kiss et al. Preferably, the feedstream comprising CO will be syngas or multicomponent syngas. The non-pure feeds will typically contain at least about 10% CO, preferably at least about 15% and at least about 50% olefin, preferable at least about 60%.

The liquid plasticizers of this invention may be synthesized using well known free radical polymerization techniques. For example, the CO containing polymers are formed in free radical polymerization processes using organic peroxides as a free radical initiator according to conventional methods. Representative initiators include, but are not limited to, dialkyl peroxides such as ditertiary-butyl peroxide, 2,5-dimethyl-2,5-ditertiary-butyl-peroxyhexane, di-cumyl peroxide; alkyl peroxides such as tertiary-butyl hydroperoxide, tertiary-octyl hydroperoxide, cumene hydroperoxide; aroyl peroxides such as benzoyl peroxide; peroxy esters such as tertiary-butyl peroxypivalate, tertiary-butyl-perbenzoate; and compounds such as azo-bis-isobutyronitrile. Free radical initiators with an appropriate half-life at reaction temperatures ranging from about 50° C. to about 230° C. can be used. Of these, t-butyl peroxypivalate, which has a half-life of about 10 hours at 66° C., is preferred.

Such feeds and initiators are useful for forming CO-containing polymers under copolymerization conditions at temperatures ranging from about 50 to about 230° C., preferably from about 50 to about 100° C., pressures ranging from about 100 to about 30,000 psig, preferably from about 100 to about 3,000 psig, and in the presence of a free radical initiator.

The term co-polymer is used herein according to its broad meaning of a macromolecule formed from two or more momomer sources. The term polymer is used herein according to its broad meaning of a macromolecule formed from at least one monomer source.

Preferably the reaction occurs in the presence of a solvent. Suitable solvents include toluene, benzene, dioxane, pentane, heptane, hexane, propylene oxide, cyclohexane, etc. Hexane is preferred.

The polymers and co-polymers utilized herein may be recovered using conventional methods, for example, evaporation of the diluent.

The number average molecular weight ("Mn") of the copolymers utilizable in accordance with the invention can range from about less than 50,000, preferably about 200 to about 2,000.

Free radical polymerizable vinyl monomers include vinyl monomers useful in the invention include styrene and styrene derivatives such as a-methylstyrene, p-methylstyrene, vinyl acetate, vinyl chloride, isobutyl vinyl ether, methyl vinyl ketone, 1-vinylpyrrolidone, acrylic acid, methacrylic acid, methylacrylate, methylmethacrylate, acrylonitrile, acrylamide, acrolein, allyl alcohol, allyl chloride, allyl acetate, mixtures thereof, and similar materials.

Because the instant invention employs free-radical polymerization to form its non-linear copolymers, the resulting non-linear copolymers may also be characterized as being non-alternating.

The instant invention provides novel polyvinyl chloride compositions having CO-containing polymers which act as plasticizers. These CO-containing polymers are low molecular weight liquid copolymers. Depending on the particular plasticizer(s) used and the type of PVC, percentage mix, etc., advantages of the instant invention include: lower plasticizer volatility; lower cost than conventional monomeric plasticizers; improved processability and compatibility; and effective lowering of the PVC resin glass transition temperature ("$T_g$").

The composition of the invention is a PVC resin which contains a novel plasticizer. More specifically, the liquid plasticizer is selected from the following:

1) A non-linear, paraffin-soluble olefin-CO copolymer. A more detailed description of these co-polymers can be found in U.S. Pat. No. 6,156,872 herein incorporated by reference.

2) A non-linear olefin-CO copolymer derived from non-pure feeds.

3) An olefin-CO—X terpolymer derived from non-pure feeds.

Here again, it should be noted that defining this copolymer as being "derived from non-pure feeds," it is meant to also include co-feeds. For example, one feed could be syngas or multicomponent syngas while the other feed is a pure vinyl acetate. The two feeds combined are the non-pure feed described herein. These copolymers may include paraffin-soluble as well as paraffin insoluble varieties. Typical molecular weights will be in the range of about less than 50,000, more typically about 200 to about 2,000. In a preferred embodiment, the olefin is ethylene.

4) A non-linear olefin-CO—X terpolymer where X is a free radically polymerizable vinyl monomer.

5) Mixtures of the plasticizers defined in 1–4.

The composition may optionally contain, in addition to the liquid plasticizers defined above, a dialkyl phthalate, or other suitable monomeric esters such as dialkyl isophthalates, dialkyl terephthalates, benzoates, trialkyl trimellitates, and the like. Preferred dialkyl phthalates are those having alkyl groups with approximately 4 to 20 carbons. In a preferred embodiment, the ratio of plasticizer to dialkyl phthalates will be in the range of 9:1 to 1:9 and the mix of these plasticizers will account for about 0.01 to 75 weight percent of the PVC resin composition. Thus, in this preferred embodiment, the polyvinyl chloride will make up approximately 25 to 99.99 weight percent of the PVC resin composition. The composition may also further comprise stabilizers, fillers, and/or other well-known additives that are commonly used in the art. Suitable stabilizers include, but are not limited to, calcium, barium, cadmium, zinc, lead and mixtures thereof. Preferably, the stabilizers will make up approximately 0.01 to 7 weight percent of the PVC resin. Suitable fillers include, but are not limited to, calcium carbonate, clay and mixture thereof. Preferably, fillers will be approximately 0.01 to 6 weight percent of the PVC resin.

In another embodiment, the invention is an article produced from the PVC resin composition described above. For instance, the PVC resin composition could be made into a film or a sheet. Articles can also be extruded, molded or cast from the PVC resin composition.

Also provided for is a method for preparing a PVC resin comprising blending polyvinyl chloride with a liquid plasticizer, as defined above. The method may further include the step of blending a dialkyl phthalate. Additionally, stabilizers and/or fillers may also be blended. Standard PVC/plasticizer blending techniques, well known to those skilled in the art, may be used such as adding the liquid plasticizers to PVC on hot rolls or in a hot mixture such as a Banbury. Typical temperatures for such blending techniques are in the range of about 20 to 300° C. Preferred temperature ranges are from about 50 to 230° C. Typical pressures for these blending techniques can range widely from about 100 to 60,000 psi. Preferred pressure ranges are in the range of about 100 to 30,000 psi. Processing aids, such as stearic acid, may optionally be used. Thus, small amounts of these processing aids may, or may not, become incorporated into the composition. Additionally, as illustrated in the examples below, the copolymer and terpolymers can be dissolved in organic solvents along with the PVC and then cast to form a film.

The invention is further described in the following non-limiting examples.

EXAMPLES

Example 1

Synthesis of Liquid Ethylene-CO Polymers Using MCS Feed

CO containing polymers using a dilute MCS feed was synthesized according to free-radical polymerization techniques as follows:

A 300 ml autoclave reactor was charged with 150 ml pure n-hexane and 0.6 g of a 75% solution of t-butyl peroxypivalate in mineral spirits. (t-Butyl peroxypivalate has a 10 hour half-life at 55° C. in a 0.2 M benzene solution, Swern, *Organic Peroxides*, John Wiley and Sons, 1970, Vol. 1, pp. 82, 87). The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane was removed on a rotary evaporator to obtain the product.

The product was characterized by IR, NMR and GPC. The FTIR spectrum of the product showed a very strong peak at 1715 cm$^{-1}$ due to carbonyl group, indicating incorporation of carbon monoxide in the product. The $^{13}$C NMR of the product indicated that the polymer had 5.1% CO incorporation and a non-linear (branched) polyethylene structure, as indicated by a broad multiplet in the $^{13}$C NMR for the alkyl region at 9–48 ppm and a multiplet at 206–218 for the CO resonance. The GPC of the product indicated a Mn of 320 and a Mw of 420.

Example 2

Synthesis of Liquid Ethylene-CO-1-octene Terpolymers

CO containing polymers using a dilute MCS as co-feed with 1-octene was synthesized according to free-radical polymerization techniques as follows:

The polymerization conditions were similar to those set forth in Example 1. A 300 ml autoclave reactor was charged with 150 ml pure n-hexane and 0.6 g of a 75% solution of t-butyl peroxypivalate in mineral spirits. 20 g 1-octene was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted octene was removed on a rotary evaporator to obtain the 2.9 g of product.

The product was characterized by IR, NMR and GPC. The FTIR spectrum of the product showed a very strong peak at 1715 cm$^{-1}$ due to carbonyl group, indicating incorporation of carbon monoxide in the product. The GPC of the product indicated a Mn of 860 and a Mw of 1010.

Example 3

Synthesis of Liquid Ethylene-CO-vinyl Acetate Terpolymers

CO containing polymers using a dilute MCS as co-feed with vinyl acetate was synthesized according to free-radical polymerization techniques as follows:

The polymerization conditions were similar to those set forth in Example 1. A 300 ml autoclave reactor was charged with 150 ml pure n-hexane and 0.6 g of a 75% solution of t-butyl peroxypivalate in mineral spirits. 2 g vinyl acetate was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted octene was removed on a rotary evaporator to obtain the 2.5 g of product.

The product was characterized by IR, NMR and GPC. The $^{13}$C NMR of the product indicated that the polymer had 9 mole % CO, 56 mole % ethylene and 35 mole % vinyl acetate. The GPC of the product indicated a Mn of 730 and a Mw of 1620.

Example 4

Synthesis of Liquid Ethylene-CO-vinyl Neo-10 Ester Terpolymers

CO containing polymers using a dilute MCS as co-feed with neo vinyl ester (Exxar™ Neo-10) was synthesized according to free-radical polymerization techniques as follows:

The polymerization conditions were similar to those set forth in Example 1. A 300 ml autoclave reactor was charged with 150 ml pure n-hexane and 0.6 g of a 75% solution of t-butyl peroxypivalate in mineral spirits. 5 g neo vinyl ester (Exxar™ Neo-10) was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted neo vinyl ester was removed initially on a rotary evaporator and then on Kugelrohr apparatus to obtain the 1.9 g of product.

The $^{13}$C NMR of the product indicated that the polymer had 4.6 mole % CO, 48 mole % ethylene and 47.4 mole % neo vinyl ester (Exxar™ Neo-10). The GPC of the product indicated a Mn of 1450 and a Mw of 2100.

Example 5

Synthesis of Liquid Ethylene-CO-vinyl Neo-10 Ester Terpolymers

CO containing polymers using a dilute MCS as co-feed with neo vinyl ester (Exxar™ Neo-10) was synthesized according to free-radical polymerization techniques as follows:

The polymerization conditions were similar to those set forth in Example 1. A 300 ml autoclave reactor was charged with 150 ml pure n-hexane and 0.6 g of a 75% solution of t-butyl peroxypivalate in mineral spirits. 2 g neo vinyl ester (Exxar™ Neo-10) was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole % hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted neo vinyl ester was removed initially on a rotary evaporator and then on Kugelrohr apparatus to obtain the product.

The $^{13}$C NMR of the product indicated that the polymer had 7.9 mole % CO, 55.6 mole % ethylene and 36.4 mole % neo vinyl ester (Exxar™ Neo-10). The GPC of the product indicated a Mn of 970 and a Mw of 1300.

Example 6

Synthesis of Liquid CO-1-octene Copolymer

A 300 ml autoclave reactor was charged with 150 ml pure n-hexane and 0.6 g of a 75% solution of t-butyl peroxypivalate in mineral spirits. 10 g 1-octene was added in the reactor. The reactor was sealed and purged with purified nitrogen. The reactor was then pressurized with CO to 700 psig. The temperature was raised to 66° C. while stirring and the pressure was maintained for 24 hours. The reactor was allowed to cool to room temperature and was then depressurized. The hexane and unreacted octene was removed on a rotary evaporator to obtain the 1.38 g of product.

The FTIR spectrum of the product showed a very strong peak at 1711 cm$^{-1}$ due to carbonyl group, indicating incorporation of carbon monoxide in the product. The $^{13}$C NMR of the product indicated that the polymer had 27 mole % CO and 73 mole % 1-octene. The GPC of the product indicated a Mn of 965 and a Mw of 1175.

Example 7

Plasticization Study Using Liquid Plasticizers Derived From MCS

In order to demonstrate in a simple manner the effect of plasticization, films of the PVC resin were prepared as follows: 10 g PVC polymer (Aldrich, 233,000) was dissolved in 150 ml THF and the solution was stirred at room temperature for 24 hrs to obtain a stock solution. 2.5 ml of PVC solution was mixed with appropriate concentration of liquid plasticizer (as THF solution) to give plasticizer content from 10 to 50%. The mixer was stirred for 12 hours at room temperature and the resultant solution poured on to horizontal aluminum or glass container. The solvent was allowed to evaporate slowly under nitrogen. After 12 hours the films were peeled away from the container. They were dried in a vacuum at over 50° C. for 12 hours. The flexibility of the films was compared by bending back and forth between the fingers; also their glass transition temperatures ("$T_g$") were evaluated using a differential scanning calorimeter ("DSC").

Relaxation in PVC resin from glassy to the plastic state and the effect of various chemical plasticizers was measured calorimetrically using a DSC (Table 1). The $T_g$ was evaluated from the step change in heat capacity, Cp (value at half ΔCp is reported), when the sample was heated at a controlled heating rate of 10 K./min. All samples analyzed were treated to similar thermal history prior to measurement. The films obtained from the PVC and carbon monoxide containing polymers described above were transparent.

TABLE 1

Effect of plasticizers on the $T_g$ of PVC

| Example Number | Sample Description | PVC $T_g$ (° C.) | Plasticizer Concentration (wt %) | Δ $T_g$ (° C.) |
|---|---|---|---|---|
| | PVC Aldrich (Mw 233,000) | 82 | — | — |
| 1 | ECO (MCS) | — | 10 | 19 |
| 2 | ECO (MCS)/Octene | — | 20 | 20 |
| 3 | ECO (MCS)-VA | — | 20 | 28 |
| 5 | ECO (MCS)-Neo-10 ester | — | 10 | 12 |
| 6 | CO/1-octene | — | 20 | 12 |
| | Phthalate | — | 20 | 40 |

The decrease in the $T_g$ of the PVC with carbon monoxide-containing polymers provides evidence that these compositions are active as PVC plasticizers.

Example 8

Synthesis of Liquid Ethylene-CO Copolymers Using Ethylene and Syngas

A 300-mL autoclave engineer's reactor was charged with 150 ml pure n-hexane and 0.64 g of t-butyl peroxide in mineral spirits. The reactor was sealed and purged with purified nitrogen. The reactor was then pressurized with an ethylene and syngas mixture (ethylene:carbon monoxide:hydrogen 70:15:15, respectively). The temperature was raised to 120° C. while stirring, and the pressure was maintained for 24 hours. The reactor was allowed to cool to room temperature and then depressurized. The hexane was removed on a rotary evaporator leaving 4.3 g of product.

The IR spectrum of the product shows a very strong peak at 1711 cm$^{-1}$ due to the carbonyl group. Thus, CO has been incorporated in the product. The NMR of the product suggests that polymer had 19.3% CO incorporation. The GPC of the product indicates a Mn of 590 and Mw of 1100 (polystyrene standards, THF solvent).

Example 9

Plasticization Study Using Liquid Ethylene-CO Plasticizers Derived From Syngas To demonstrate in a simple manner the effect of plasticization, films of the polymers were prepared as follows: 10 g PVC polymer (Aldrich, 233,000) were dissolved in 150 ml THF and the solution was stirred at room temperature for 24 hours to obtain a stock solution. Then 2.5 ml of PVC solution were mixed with an appropriate concentration of liquid plasticizer (as THF solution, sometimes hot THF solution) to give plasticizer content from 10 to 50%. The solvent was allowed to evaporate under nitrogen. After 12 hours the films were peeled away from the container. They were dried in a vacuum oven at 50° C. for 12 hours. Film flexibility was compared by bending the films back and forth between the fingers; also, their $T_g$ was evaluated.

Relaxation in PVC from glassy to the plastic state and the effect of various chemical plastizers were measured calorimetrically using a DSC. The Tg was evaluated from the step change in heat capacity, Cp (value at half ΔCp is reported), when the sample was heated at a controlled heating rate of 10 K./min. All samples analyzed were exposed to a similar thermal history before measurement. The films obtained from the PVC and carbon-monoxide-containing polymers described above were transparent.

Table 2 shows the decrease in the $T_g$ of PVC upon addition of ethylene-CO copolymers. The commercial plasticizer di-tridecyl phthalate (DTDP) is also plotted as a reference.

TABLE 2

Effect of ethylene-CO plasticizers on the $T_g$ of PVC

| Plasticizer Concentration (wt %) | $T_g$ of PVC + DTDP | $T_g$ of PVC + ECO polymer of Example 8 |
| --- | --- | --- |
| 0 | 82 | 82 |
| 10 | 60 | 52 |
| 20 | 43 | 34 |
| 30 | 27 | 21 |
| 40 | — | 13 |
| 50 | 10 | 4 |

The decrease in the $T_g$ of the PVC with ethylene/carbon monoxide copolymers provides evidence that these compositions are active as PVC plasticizers.

Example 10

Synthesis of Liquid Ethylene-CO-alpha-olefin Terpolymers Using Syngas

A 300-mL autoclave engineer's reactor was charged with 150 ml pure n-hexane and 0.64 g of a 75% solution of t-butyl peroxypivalate in mineral spirits. The reactor was sealed and purged with purified nitrogen. The reactor was then pressurized with ethylene and syngas mixture (ethylene:carbon monoxide:hydrogen 70:15:15, respectively). Then 10.8 g of 1-butene was added, the temperature was raised to 66° C. while stirring, and the pressure was maintained for 24 hours. The reactor was allowed to cool to room temperature and then depressurized. The hexane was removed on a rotary evaporator, leaving 4.9 g of the product.

The IR spectrum of the product shows a very strong peak at 1711 cm$^{-1}$ due to the carbonyl group. Thus, CO has been incorporated in the product. The NMR of the product suggests that the polymer has 25.8% CO incorporation. The NMR spectrum of the terpolymer suggested that it has 134.9 branches per 1000 carbons versus 65.5 branches per 1000 carbons for a control experiment without 1-butene termonomer. This observation indicates that increased in branching may result from alpha-olefin incorporation in the polymer. The GPC of the product indicates a Mn of 1000 and Mw of 2000 (polystyrene standards, THF solvent).

Example 11

Synthesis of Liquid Ethylene-CO-alpha-olefin Terpolymers Using Syngas

A 300-mL autoclave engineer's reactor was charged with 150 ml pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). Then 5.9 g of 1-butene was added, the temperature was raised to 66° C. while stirring, and the pressure was maintained for 24 hours. The reactor was allowed to cool to room temperature and then depressurized. The hexane was removed on a rotary evaporator leaving 7.0 g of the product.

The IR spectrum of the product showed a very strong peak at 1711 cm$^{-1}$ due to the carbonyl group. Thus, CO has been incorporated in the product. The NMR of the product suggested that the polymer had 29.6% CO incorporation. The NMR spectrum of the terpolymer suggested that it has 101 branches per 1000 carbons versus 65.5 branches per 1000 carbons obtained in a control experiment without the 1-butene termonomer. This observation indicates that increased branching may result from alpha-olefin incorporation in the polymer. The GPC of the product indicates a Mn of 500 and Mw of 1000 (polystyrene standards, THF solvent).

Example 12

Synthesis of Liquid Ethylene-CO-alpha-olefin Terpolymers Using Syngas

A 300-mL autoclave engineer's reactor was charged with 150-mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). Then 5.9 g of propylene was added, the temperature was raised to 66° C. while stirring, and the pressure was maintained for 24 hours. The reactor was allowed to cool to room temperature and was then depressurized. The hexane was removed on a rotary evaporator, leaving 7.6 g of the product.

The IR spectrum of the product showed a very strong peak at 1711 cm$^{-1}$ due to the carbonyl group. Thus, CO has been incorporated in the product. The NMR of the product suggested that the polymer had 17.5% CO incorporation. The NMR spectrum of the terpolymer suggested that it has 72.8 branches per 1000 carbons versus 65.5 branches per 1000 carbons obtained in a control experiment without the propylene termonomer. This observation indicates that increased branching may result from alpha-olefin incorporation in the polymer. The GPC of the product indicated a Mn of 500 and Mw of 1000 (polystyrene standards, THF solvent).

Example 13

Synthesis of Liquid Ethylene-CO-alpha-olefin Terpolymers Using Syngas

A 300-mL autoclave engineer's reactor was charged with 150 ml pure n-hexane and 0.64 g of a 75% solution of t-butyl peroxypivalate in mineral spirits. The reactor was sealed and purged with purified nitrogen. The reactor was then pressurized with an ethylene and syngas (ethylene:carbon monoxide:hydrogen 70:15:15, respectively) mixture. Then 10.8 g of 2-butene was added, the temperature was raised to 66° C. while stirring, and the pressure was maintained for 24 hours. The reactor was allowed to cool to room temperature and then depressurized. The hexane was removed on a rotary evaporator, leaving 6.7 g of the product.

The IR spectrum of the product showed a very strong peak at 1711 cm$^{-1}$ due to the carbonyl group. Thus, CO has been incorporated in the product. The NMR of the product suggested that the polymer had 18.2% CO incorporation. The NMR spectrum of the terpolymer suggested that it has 93.2 branches per 1000 carbons versus 65.5 branches per 1000 carbons obtained in a control experiment without 2-butene termonomer. This observation indicates that increased branching may result from alpha-olefin incorporation in the polymer. The GPC of the product indicated a Mn of 590 and Mw of 1120 (polystyrene standards, THF solvent).

Example 14

Plasticization Study Using Liquid Ethylene-CO-alpha-olefin Plasticizers Derived From Syngas To demonstrate in a simple manner the effect of plasticization, films of the polymers were prepared as follows: 10 g PVC polymer (Aldrich, 233,000) were dissolved in 150 ml THF and the solution was stirred at room temperature for 24 hours to obtain a stock solution. Then 2.5 ml of PVC solution was mixed with an appropriate concentration of liquid plasticizer (as THF solution, sometimes hot THF solution) to give a plasticizer content from 10 to 50%. The solvent was allowed to evaporate under nitrogen. After 12 hours the films were peeled away from the container. They were dried in a vacuum oven at 50° C. for 12 hours. Film flexibility was compared by bending the films back and forth between the fingers; also, their $T_g$ was evaluated.

Relaxation in PVC from glassy to the plastic state and the effect of various chemical plasticizers were measured calorimetrically using DSC. The $T_g$ was evaluated from the step change in heat capacity, Cp (value at half $\Delta$Cp is reported), when the sample was heated at a controlled heating rate of 10 K./min. All samples analyzed were exposed to a similar thermal history before measurement. The films obtained from the PVC and carbon-monoxide-containing polymers described above were transparent.

Table 3 shows the decrease in the $T_g$ of PVC upon addition of various levels of these terpolymers. The commercial plasticizer, di-tridecyl phthalate (DTDP) is also plotted as a reference.

TABLE 3

Effect of ethylene-CO-alpha-olefin plasticizers on the $T_g$ of PVC

| Plasticizer Concentration (wt %) | $T_g$ of PVC + DTDP | $T_g$ of PVC + terpolymer of Example 10 | $T_g$ of PVC + terpolymer of Example 11 | $T_g$ of PVC + terpolymer of Example 12 | $T_g$ of PVC + terpolymer of Example 13 |
|---|---|---|---|---|---|
| 0 | 82 | 82 | 82 | 82 | 82 |
| 10 | 60 | 55 | 63.66 | 63.25 | 64.16 |
| 20 | 43 | 42 | 50.79 | 48.07 | 51.12 |
| 30 | 27 | 31 | 40.91 | 41.1 | 39.9 |
| 40 | — | 25 | | 31.7 | 29.7 |
| 50 | 10 | 20 | 28.4 | 24.62 | 23.35 |

The decrease in the $T_g$ of the PVC resin with ethylene/carbon monoxide copolymers provides evidence that these compositions are active as PVC plasticizers.

The foregoing examples clearly demonstrate that the instant invention provides compatible CO-containing liquid platsticizers for use with PVC. More specifically, the PVC resins of the instant invention have decreased $T_g$. Additionally, the compositions produced in the non-limiting examples showed no evidence of phase separation which suggests adequate compatibility. Finally, the instant invention can be synthesized using relatively inexpensive non-pure fees such as syngas and MCS. Hence, the desirable characteristics (e.g., low $T_g$, compatibility and lower cost) discussed in the background section are satisfied by the instant invention.

Example 15

Synthesis of Liquid Ethylene-CO Copolymer

A 300-mL autoclave engineer's reactor was charged with 150 ml pure n-hexane and 0.5 g of t-butyl peroxide. The reactor was sealed and purged with purified nitrogen. The reactor was then pressurized with ethylene and carbon monoxide (80:20) mixture. The temperature was raised to 120° C. while stirring, and the pressure was maintained at 700 psig for 24 hours. The reactor was allowed to cool to room temperature and depressurized. Hexane was removed using a rotary evaporator, leaving 6.91 g of the product.

The IR spectrum of the product showed a very strong peak at 1706 cm$^{-1}$ due to the carbonyl group. Thus, CO has been incorporated in the product. NMR of the product suggested that the polymer had 25.9% CO incorporation. The NMR also suggested that there are 96 branches/1000° C. GPC of the product indicated a Mn of 350 and Mw of 750 (polystyrene standards, THF solvent).

Example 16

Synthesis of Liquid Ethylene-CO Copolymer Using Syngas Feed

A 300-mL autoclave engineer's reactor was charged with 150 ml pure n-hexane and 0.5 g of t-butyl peroxide. The reactor was sealed and purged with purified nitrogen. The reactor was then pressurized with ethylene and syngas (ethylene:carbon monoxide:hydrogen 70:15:15, respectively) mixture. The temperature was raised to 120° C. while stirring, and the pressure was maintained at 700 psig for 24 hours. The reactor was allowed to cool to room temperature and depressurized. Hexane was removed using a rotary evaporator, leaving 4.3 g of the product.

The IR spectrum of the product showed a very strong peak at 1709 cm$^{-1}$ due to the carbonyl group. Thus, CO has been incorporated in the product. NMR of the product suggested that the polymer had 19.3% CO incorporation. The NMR also suggested that there are 172 branches/1000C. GPC of the product indicated a Mn of 590 and Mw of 1100 (polystyrene standards, THF solvent).

Example 17

Synthesis of Liquid 1-butene-CO Copolymer Using Syngas Feed

A 300-mL autoclave engineer's reactor was charged with 150 ml pure n-hexane and 0.5 g of a 75% solution of t-butyl peroxypivalate in mineral spirits. The reactor was sealed and purged with purified nitrogen. 4.89 g of 1-butene was added into stainless steel addition vessel and attached to the reactor. The reactor was then pressurized with syngas (carbon monoxide:hydrogen 50:50) mixture to 700 psig. The temperature was raised to 66° C. while stirring. The butene was then introduced into the reactor from the addition vessel and the pressure was maintained at 700 psig for 24 hours. The reactor was allowed to cool to room temperature and depressurized. Hexane was removed using a rotary evaporator, leaving 0.98 g of the product. The IR spectrum of the product showed a very strong peak at 1709 cm$^{-1}$ due to the carbonyl group. Thus, CO has been incorporated in the product.

Example 18

Synthesis of Liquid Ethylene-CO-butene Terpolymer Using Syngas Feed

A 300-mL autoclave engineer's reactor was charged with 150 ml pure n-hexane and 0.64 g of a 75% solution of t-butyl peroxypivalate in mineral spirits. The reactor was sealed and purged with purified nitrogen. 5.93 g of 1-butene was added into stainless steel addition vessel and attached to the reactor. The reactor was then pressurized with ethylene and syngas (ethylene:carbon monoxide:hydrogen 70:15:15, respectively) mixture. The temperature was raised to 66° C. while stirring. The butene was then introduced into the reactor from the addition vessel and the pressure was maintained at 700 psig for 24 hours. The reactor was allowed to cool to room temperature and depressurized. Hexane was removed using a rotary evaporator, leaving 7.01 g of the product.

NMR of the product suggested that the polymer had 29.6% CO incorporation. The NMR also suggested that there are 101 branches/1000C. GPC of the product indicated a Mn of 500 and Mw of 1000 (polystyrene standards, THF solvent).

Example 19

Synthesis of Liquid 1-butene-CO Copolymer

A 300-mL autoclave engineer's reactor was charged with 150 ml pure n-hexane and 0.64 g of a 75% solution of t-butyl peroxypivalate in mineral spirits. The reactor was sealed and purged with purified nitrogen. 10.172 g of 1-butene was added into stainless steel addition vessel and attached to the reactor. The reactor was then pressurized with carbon monoxide to 350 psig and the temperature was raised to 66° C. while stirring. The butene was then introduced into the reactor from the addition vessel and the pressure was increased with carbon monoxide to 700 pisg and maintained at 700 psig for 24 hours. The reactor was allowed to cool to room temperature and depressurized. Hexane was removed using a rotary evaporator, leaving 1.4 g of the product.

The IR spectrum of the product showed a very strong peak at 1711 cm$^{-1}$ due to the carbonyl group. Thus, CO has been incorporated in the product. NMR of the product suggested that the polymer had 24% CO incorporation. The NMR also suggested that there are 223 branches/1000C. GPC of the product indicated a Mn of 470 and Mw of 600 (polystyrene standards, THF solvent).

Example 20

Synthesis of Liquid Propylene-CO Copolymer

A 300-mL autoclave engineer's reactor was charged with 150 ml pure n-hexane and 0.64 g of a 75% solution of t-butyl peroxypivalate in mineral spirits. The reactor was sealed and purged with purified nitrogen. 10.682 g of propylene was added into stainless steel addition vessel and attached to the reactor. The reactor was then pressurized with carbon monoxide to 350 psig and the temperature was raised to 66° C. while stirring. The propylene was then introduced into the reactor from the addition vessel and the pressure was increased with carbon monoxide to 700 pisg and maintained at 700 psig for 24 hours. The reactor was allowed to cool to room temperature and depressurized. Hexane was removed using a rotary evaporator, leaving 1.5 g of the product.

The IR spectrum of the product showed a very strong peak at 1711 cm$^{-1}$ due to the carbonyl group. Thus, CO has been incorporated in the product.

Example 21

Synthesis of Liquid CO-containing Polymer From Raf II and CO Feed

A 300-mL autoclave engineer's reactor was charged with 150 ml pure n-hexane and 0.64 g of a 75% solution of t-butyl peroxypivalate in mineral spirits. The reactor was sealed and purged with purified nitrogen. 10.475 g of RAF II mixture (mole % cis 2-butene: 17%, trans 2-butene 17%, Isobutylene 5.51%, 1,3-butadiene 5237 ppm and remaining 1-butene) was added into stainless steel addition vessel and attached to the reactor. The reactor was then pressurized with carbon monoxide to 350 psig and the temperature was raised to 66° C. while stirring. The RAF II was then introduced into the reactor from the addition vessel and the pressure was increased with carbon monoxide to 700 pisg and maintained at 700 psig for 24 hours. The reactor was allowed to cool to room temperature and depressurized. Hexane was removed using a rotary evaporator, leaving 1.33 g of the product.

The IR spectrum of the product showed a very strong peak at 1711 cm$^{-1}$ due to the carbonyl group. Thus, CO has been incorporated in the product.

The invention having been thus described, it will be apparent that the same may be varied in many ways without departing from the spirit and scope of the invention, as defined by the following claims.

What is claimed is:

1. A PVC resin composition comprising a polyvinyl chloride and a liquid plasticizer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear olefin-CO—X terpolymer and mixtures thereof, wherein X is selected from the group consisting of free radically polymerizable vinyl monomers and mixtures thereof, wherein the liquid plasticizer has about 65.5 or more branches per 1,000 carbon atoms, and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof, and wherein said PVC resin composition has a glass transition temperature ($T_g$) at least 15% lower than the $T_g$ of said polyvinyl chloride.

2. The composition of claim 1 wherein said liquid plasticizer is a non-linear, paraffin-soluble olefin-CO copolymer.

3. The composition of claim 1 wherein said liquid plasticizer is a non-linear olefin-CO copolymer derived from non-pure feeds.

4. The composition of claim 1 wherein said liquid plasticizer is an olefin-CO—X terpolymer derived from non-pure feeds.

5. The composition of claim 1 wherein said liquid plasticizer is a non-linear olefin-CO—X terpolymer.

6. The composition according to claim 1 further comprising a co-plasticizer selected from the group consisting of dialkyl phthalate, dialkyl isophthalate, dialkyl terephthalate, trialkyl trimellitate, tetraalkyl pyromellitate, monoalkyl benzoate, dialkyl azelate, dialkyl sebacate, dialkyl adipate, and mixtures thereof.

7. The composition according to claim 6 wherein said compound's alkyl groups each have about 4 to 20 carbon atoms.

8. The composition according to claim 6 wherein the weight ratio of said liquid plasticizer to said co-plasticizer is in the range of about 1:9 to 9:1.

9. The composition according to claim 6 wherein said co-plasticizer and said liquid plasticizer comprise about 0.01 to 75 wt % of the PVC resin composition.

10. The composition of claim 1 or 6 further comprising a stabilizer selected from the group consisting of calcium, barium, cadmium, zinc, lead, and mixtures thereof.

11. The composition of claim 10 further comprising a filler selected from the group consisting of calcium carbonate, clay, and mixtures thereof.

12. The composition of claim 1 or 6 further comprising a filler selected from the group consisting of calcium carbonate, clay, and mixtures thereof.

13. The composition of claim 1 wherein said polyvinyl chloride comprises from about 25 to 99.99 wt % of the PVC resin and said liquid plasticizer comprises from about 0.01 to 75 wt % of the PVC resin.

14. An article formed from the PVC resin composition according to claim 1.

15. A method for a preparing a PVC resin comprising blending a polyvinyl chloride with a liquid plasticizer to lower the glass transition temperature ($T_g$ of said polyvinyl chloride by at least 15%, wherein said liquid plasticizer is selected from the group consisting of; i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear olefin-CO—X terpolymer and mixtures thereof, wherein X is selected from the group consisting of free radically polymerizable vinyl monomers and mixtures thereof wherein the liquid plasticizer has about 65.5 or more branches per 1,000 carbon atoms, and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

16. The method according to claim 15 further comprising the step of blending a co-plasticizer selected from the group consisting of dialkyl phthalate, dialkyl isophthalate, dialkyl terephthalate, trialkyl trimellitate, tetraalkyl pyromellitate, monoalkyl benzoate, dialkyl azelate, dialkyl sebacate, dialkyl adipate, and mixtures thereof.

17. The method of claim 15 or 16 further comprising the step of blending a stabilizer selected from the group consisting of calcium, barium, cadmium, zinc, lead, and mixtures thereof.

18. The method of claim 15 or 16 further comprising the step of blending a filler selected from the group consisting of calcium carbonate, clay, and mixtures thereof.

19. The method of claim 17 further comprising the step of blending a filler selected from the group consisting of calcium carbonate, clay, and mixtures thereof.

20. The method according to claim 15 wherein said liquid plasticizer is a non-linear, paraffin-soluble olefin-CO copolymer.

21. The method according to claim 15 wherein said liquid plasticizer further comprises acetylenically unsaturated monomer units.

22. The product formed by the method of claim 15.

23. The product formed by the method of claim 16.

24. The method according to claim 15 further comprising forming an article from the PVC resin.

25. The method of claim 15 wherein said second feed comprising carbon monoxide contains components selected from the group consisting of hydrogen, carbon monoxide, methane, acetylene, paraffins and mixtures thereof.

* * * * *